(12) United States Patent
Council

(10) Patent No.: US 6,483,910 B1
(45) Date of Patent: *Nov. 19, 2002

(54) METHOD AND APPARATUS FOR CHARGING A FEE TO A PARTY INITIATING A TELEPHONE CALL WHEN THE PARTY IS NOT ON AN AUTHORIZATION LIST ASSOCIATED WITH THE CALLED PARTY

(75) Inventor: Michael O. Council, Cordele, GA (US)

(73) Assignee: CBT Flint Partners, Cordele, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,433

(22) Filed: Aug. 27, 1998

(51) Int. Cl.[7] .............................................. H04M 15/00
(52) U.S. Cl. ............................ 379/127.01; 379/121.01; 379/114.1; 379/114.28
(58) Field of Search ................................. 379/114, 115, 379/121, 127, 142, 188, 189, 196, 198, 199, 114.1, 207.15, 207.14, 201.01, 114.05, 114.13, 115.01, 115.02, 121.01, 127.01, 127.02, 130, 140; 455/406, 407, 408, 409

(56) References Cited

U.S. PATENT DOCUMENTS

| | | | | |
|---|---|---|---|---|
| 5,381,467 A | * | 1/1995 | Rosinski et al. ............. | 379/114 |
| 5,473,671 A | * | 12/1995 | Partridge, III ............... | 379/142 |
| 5,557,664 A | * | 9/1996 | Burns et al. ................. | 379/114 |
| 5,579,379 A | * | 11/1996 | D'Amico et al. ............. | 379/112 |
| 5,651,053 A | * | 7/1997 | Mitchell ..................... | 379/142 |
| 5,680,446 A | * | 10/1997 | Fleischer, III et al. ...... | 379/114 |
| 5,692,038 A | * | 11/1997 | Kraus et al. ................. | 379/210 |
| 5,832,072 A | * | 11/1998 | Rozenblit ................... | 379/142 |
| 6,169,891 B1 | * | 1/2001 | Gorham et al. ............. | 379/114 |
| 6,252,953 B1 | * | 6/2001 | Gruchala et al. ........... | 379/207 |
| 6,263,056 B1 | * | 7/2001 | Gruchala et al. ........... | 379/114 |
| 6,353,663 B1 | * | 3/2002 | Stevens et al. ........ | 379/114.22 |
| 6,405,028 B1 | * | 6/2002 | Depaola et al. ............. | 455/406 |

* cited by examiner

Primary Examiner—Rexford Barnie
(74) Attorney, Agent, or Firm—Thomas, Kayden, Horstemeyer & Risley, LLP

(57) ABSTRACT

The present invention provides a method and apparatus for determining whether a party initiating a telephone call is on a list of parties authorized by the called party. If the calling party is not on the list of authorized parties, a fee is charged to the calling party. All or a portion of this fee may be paid to the called party or may be applied to the called party's telephone service billing account to reduce the called party's telephone bill. Preferably, the present invention is implemented at the called party's central office, i.e., at the central office which services the called party. In accordance with common-channel signaling, commonly referred to as signaling system 7 (SS7), the calling party's telephone number and identity are received in the call signaling data transmitted to the central office which services the called party. Processing equipment located at the called party's central office is programmed to compare the calling party's identity and/or telephone number with a list of authorized identities and/or telephone numbers associated with the called party to determine whether the calling party is an authorized party.

19 Claims, 4 Drawing Sheets

METHOD AND APPARATUS FOR CHARGING A FEE TO A PARTY INITIATING A TELEPHONE CALL WHEN THE PARTY IS NOT ON AN AUTHORIZATION LIST ASSOCIATED WITH THE CALLED PARTY

CROSS-REFERENCE TO RELATED APPLICATIONS

This document claims priority to and the benefit of the filing date of co-pending and commonly assigned provisional application entitled "A METHOD AND APPARATUS FOR BILLING A FEE TO A PARTY INITIATING A TELEPHONE CALL WHEN THE PARTY IS NOT ON A LIST OF AUTHORIZED PARTIES" assigned Ser. No. 60/095,939, filed Aug. 10, 1998, which is hereby incorporated by reference herein.

TECHNICAL FIELD OF THE INVENTION

The present invention relates to communications and, more particularly, to a method and apparatus for charging a fee to a calling party initiating a telephone call to a called party when the calling party is not on an authorization list associated with the called party.

BACKGROUND OF THE INVENTION

Many businesses utilize telemarketing as a means of soliciting customers in order to promote or sell the company's products and/or services. Telephone companies have not yet successfully employed a mechanism which either allows the targeted party to avoid the telephone solicitation or to receive some type of pecuniary benefit for receiving the solicitation.

A service known as Caller-ID is now available which allows a party receiving a telephone call to visually review the telephone number and/or the identity of the calling party before deciding whether to accept the telephone call. However, Caller-ID has several disadvantages. First of all, when the called party receives a telephone call, the called party must visually review the caller's identity and/or the telephone number on the display of the Caller-ID device to determine whether he or she wishes to accept the telephone call. Therefore, the telephone rings regardless of whether or not the called party is interested in accepting the call, which interrupts the called party. Although the Caller-ID service does provide the subscriber with the option of blocking telephone calls, it does not provide for billing the calling party a fee in order to connect the calling part with the called party.

Secondly, many telephone calls show up on the Caller-ID display as "unknown" or "private" numbers, thereby preventing the called party from ascertaining the telephone number and/or identity of the calling party. Therefore, the called party often feels compelled to accept the call when this message is displayed even though the called party does not know the telephone number and/or the identity of the calling party.

Accordingly, a need exists for a method and apparatus that allows a receiving party of a telephone call to effectively block the call and/or accept the in exchange for some pecuniary benefit charged to the party initiating the call.

SUMMARY OF THE INVENTION

The present invention provides a method and apparatus for determining whether a party initiating a telephone call is on a list of parties authorized by the called party. If the calling party is not on the list of authorized parties, a fee is charged to the calling party. All or a portion of this fee may be paid to the called party or may be applied to the called party's telephone service billing account to reduce the called party's telephone bill. The present invention is not limited with respect to the manner in which the fee is collected and/or used after the calling party has been charged.

The present invention is also not limited with respect to the location at which the method and/or apparatus are located in the telephone network. Preferably, the present invention is implemented at the called party's central office, i.e., at the central office which services the called party. In accordance with common-channel signaling, commonly referred to as signaling system 7 (SS7), the calling party's telephone number and identity are received in the call signaling data transmitted to the central office which services the called party. Many services, such as, for example, caller-ID, are implemented at the called party's central office. Therefore, processing equipment is already available at central offices for detecting the calling party's identity and telephone number and for processing this information. Preferably, this processing equipment at the called party's central office is programmed in accordance with the present invention to compare the calling party's identity and/or telephone number with a list of authorized identities and/or telephone numbers associated with the called party to determine whether the calling party is an authorized party.

Preferably, the service provided by the present invention is optional and can be enabled or disabled at the called party's central office depending on whether the called party has subscribed to the service. Assuming the called party has subscribed to the service, if the calling party is not an authorized party, the processing equipment either automatically charges the calling party a connection fee and connects the calling party with the called party, or informs the calling party that it is not an authorized party and gives the calling party the option of being disconnected or being billed the connection fee and connected to the called party. In the later case, if the calling party authorizes the connection fee to be billed, the calling party is then connected to the called party. Otherwise, the calling party is disconnected.

These and other features and advantages of the present invention will become apparent from the following description, drawings and claims.

DETAILED DESCRIPTION OF THE INVENTION

Figure 1:
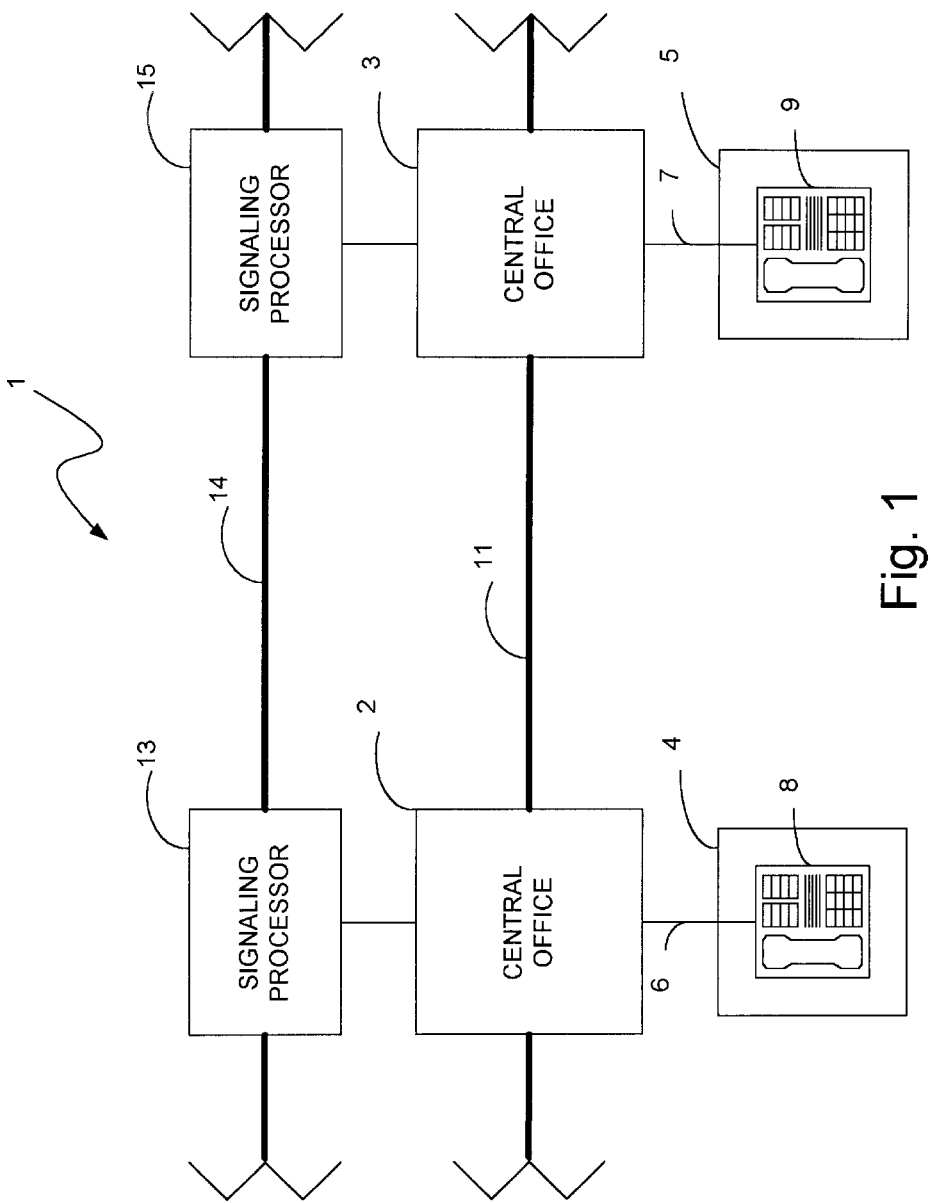
FIG. 1 is a block diagram of a typical telephone network implementing common-channel signaling, commonly referred to as signaling system 7 (SS7).
Figure 4:
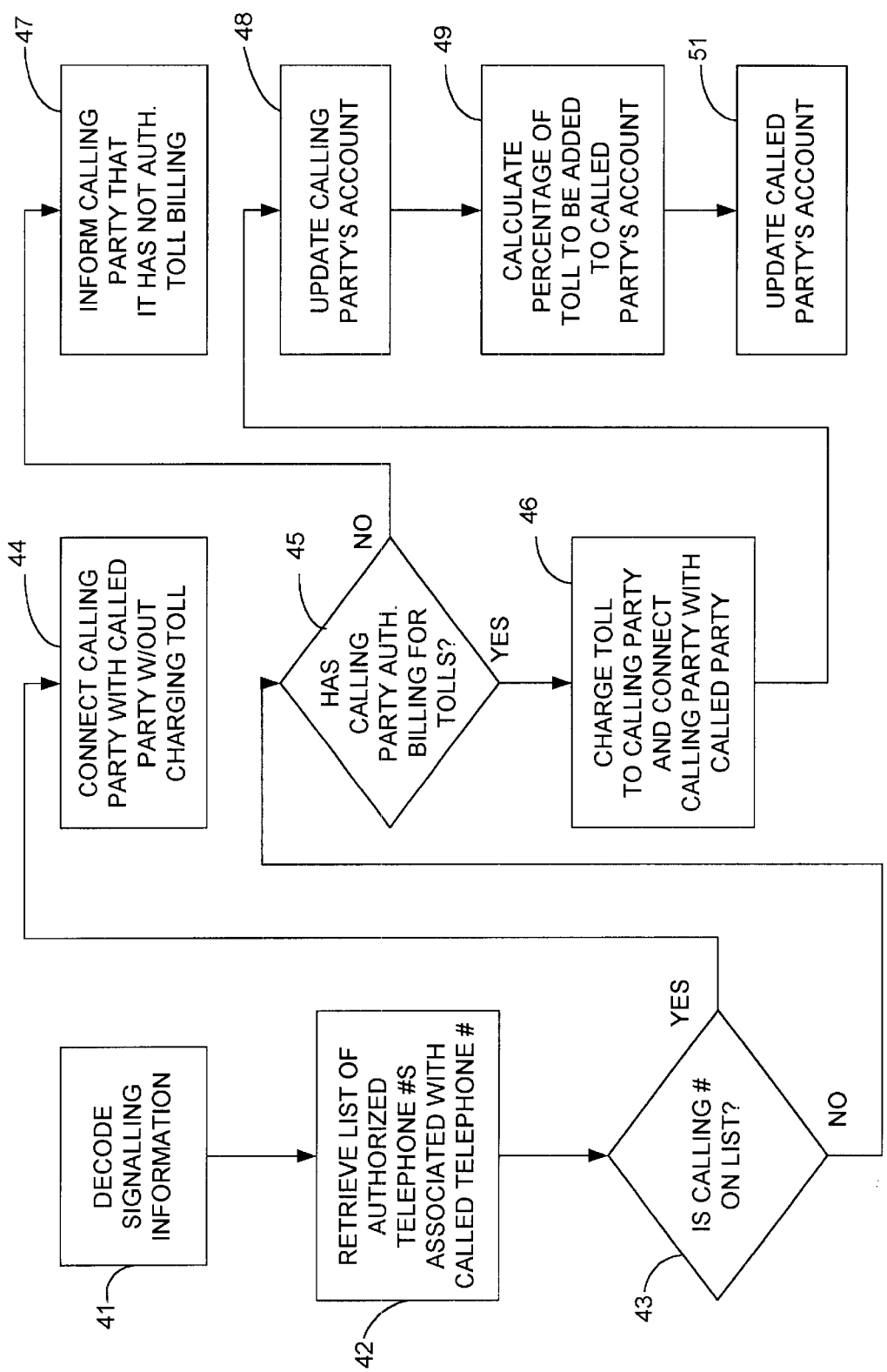
FIG. 4 is a flow chart functionally demonstrating the method of the present invention in accordance with a second embodiment.

FIG. 4 illustrates a block diagram of a telephone system 1 in which the method and apparatus of the present invention may be implemented. For ease of illustration, only two customer premises 4 and 5 and the central offices 2 and 3 to which they are connected are shown in FIG. 1. Central offices 2 and 3 provide the switching operations for connecting a calling party located at a customer premises 5 with a called party located at another customer premises 4. A twisted, or copper, pair 6 connects the central office 2 to a telephone 8 located at the customer premises 4. The central office 2 is connected to central office 3 via a cable trunk 11. The central office 3 is connected to a telephone 9 located at customer premises 5 via a twisted, or copper, pair 7. Voice information is transmitted over trunk 11 between central offices 2 and 3.

Preferably, call signaling is accomplished in accordance with the common-channel signaling protocol which is well known in the communications industry and which utilizes a separate dedicated data channel to carry signaling information in the form of short packets of data. In accordance with this protocol, the packets of data contain call signaling information as well as the identification and/or telephone number of the calling party. These packets are transmitted between the signaling processors 13 and 15 via cable trunk 14. The signaling processors 13 and 15 determine the switching of the customer circuits to be performed by switching modules (not shown) located at the central offices 2 and 3 to cause the calling party located at customer premises 5 to ultimately be connected to the called party located at customer premises 4.

Figure 2:
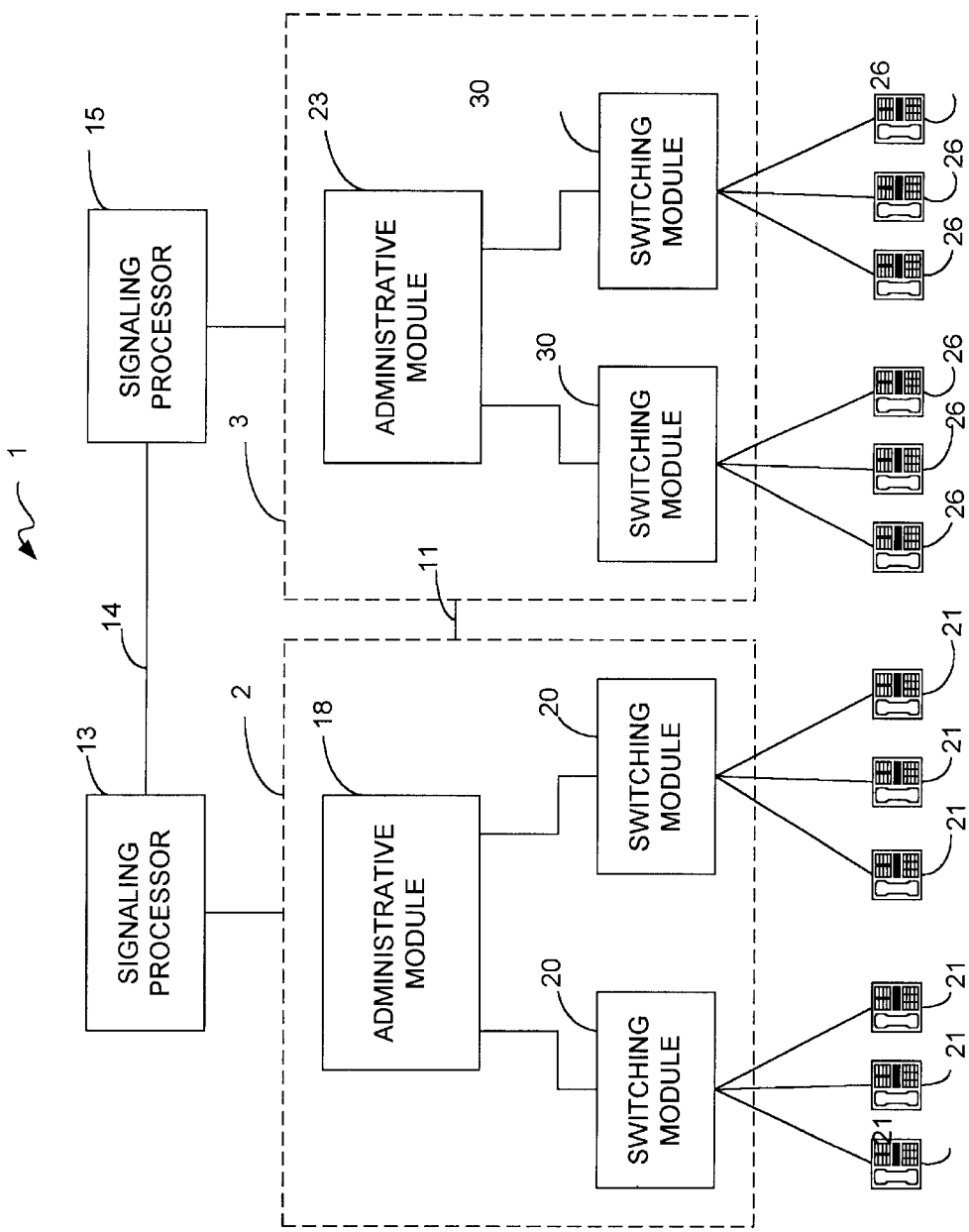
FIG. 2 is a block diagram illustrating the components of the central office shown in FIG. 1.

FIG. 2 is a block diagram which illustrates the central offices 2 and 3 in more detail. Each of the central offices comprise an administrative module and a plurality of switching modules. The functions of these components will be described with respect to central office 2. The administrative module 18 receives the call signaling information from the signaling processor 13 and causes the switching modules 20 to be switched to set up call sessions for telephones 21. The administrative module 18 also handles all billing tasks for the central office 2 and creates billing files that are ultimately dumped to a location designated by the telephone company where they are used to generate customers' bills. The administrative module comprises a computer (not shown) running software for performing all of these tasks. The administrative module 18 also comprises a memory device (not shown) in communication with the computer with for storing any files used by or generated by the computer and any other software needed by the computer for performing all of its tasks.

The switching modules 20 perform the switching of the customer circuits. Preferably, the method of the present invention is implemented in part by the switching modules 20 and in part by the administrative module 18. Each of the switching modules comprises a computer for performing the switching functions. This computer preferably is utilized in accordance with the present invention to determine whether the identity and/or telephone number of the calling party is on a list of parties authorized by the called parties. Each switching module 20 contains a list which corresponds to each of the called parties serviced by that particular switching module. Once this determination is made by the switching module 20, the switching module 20 takes the appropriate action. The administrative module 18 calculates all billing information relating to the fee to be charged to and collected from the calling party.

Figure 3:
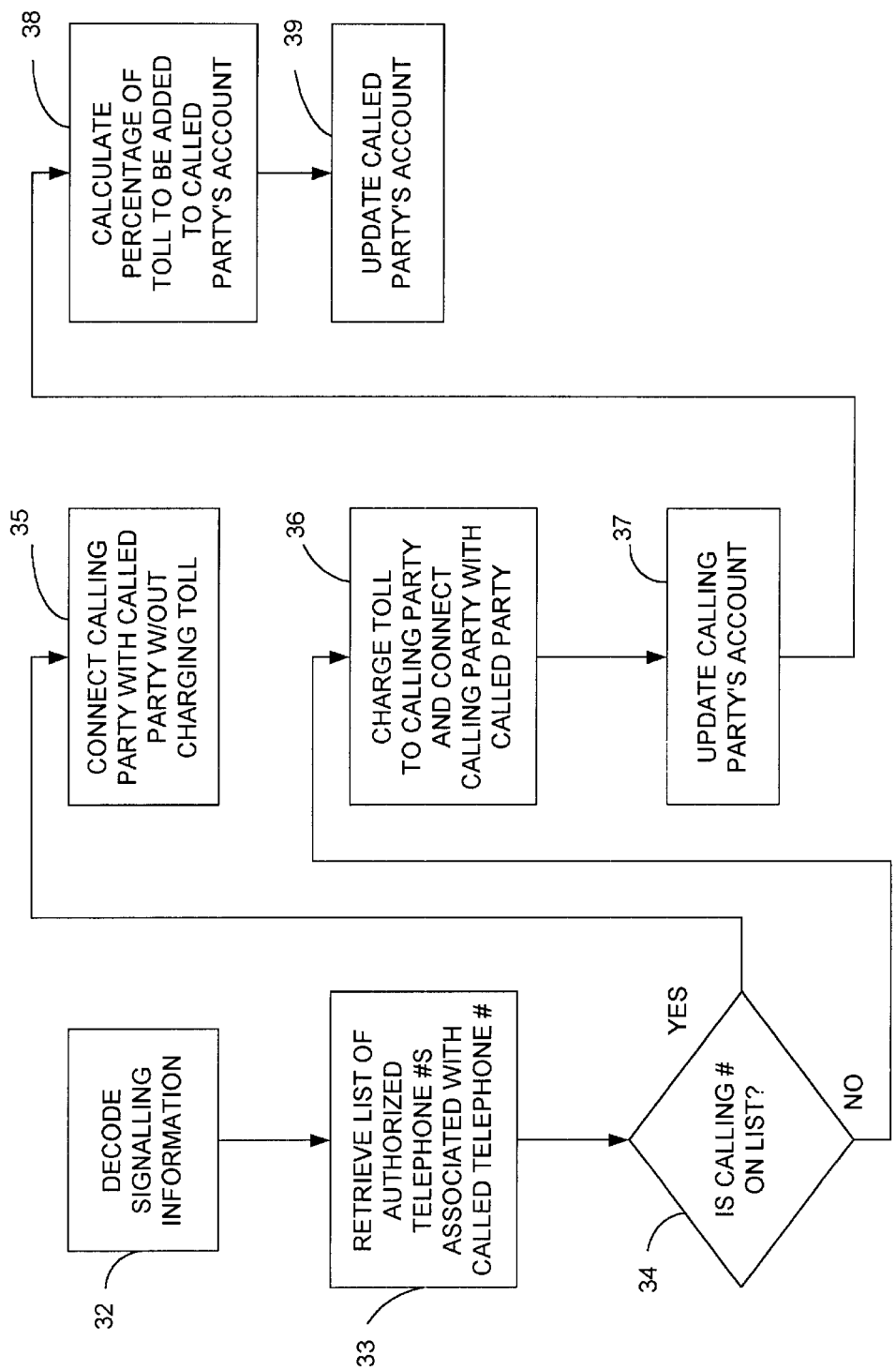
FIG. 3 is a flow chart functionally demonstrating the method of the present invention in accordance with a first embodiment.

This method of the present invention is shown in detail in FIG. 3 in accordance with a first embodiment. When a calling party initiates a telephone call, the call signaling information is decoded in the manner discussed above, as indicated at block 32. It will be understood by those skilled in the art that the method and apparatus of the present invention apply to all types of communications devices which utilize the telephone network including, but not limited to, for example, analog telephones, digital telephones, cordless telephones, hand-held devices, facsimile machines, pagers, cellular telephones, etc. It will be understood by those skilled in the art the manner in which the method and apparatus of the present invention apply to all such devices.

The information decoded at block 12 will include both the calling party's telephone number, as well as the called party's telephone number. This information may also contain the identity of the calling party. Preferably, the called party's telephone number is used to generate a memory address, or a block of addresses, at which the called party's list of authorized calling parties is stored. The computer of the switching module 20 then compares the calling party's telephone number with the telephone numbers contained in the list, as indicated at blocks 33 and 34 and makes a determination as to whether the calling party's telephone number is contained on the list of authorized calling parties.

If so, the calling party is connected to the called party by the switching module without a fee being charged to the calling party's account, as indicated at block 35. If not, the calling party is charged a fee and the calling party is connected with the called party, as indicated at block 36. The calling party's billing account is then updated, as indicated at block 37. The administrative module 18 then calculates the percentage of the collected fee to be added to the called party's account, as indicated at block 38. The administrative module then updates the called party's billing account, as indicated at block 39. It will be understood by those skilled in the art that the order in which steps 35 through 39 are performed is not critical to the present invention. For example, the operations occurring at block 37 may be performed prior to the calling party actually being connected to the called party. Similarly, the called party's account could be updated before the calling party's account is updated. Also, other determinations may also be made, such as, for example, whether the calling party's billing account is current, i.e., whether or not the calling party has been delinquent in paying its telephone bill or its toll fee bill.

FIG. 4 illustrates an alternative embodiment of the present invention which is similar to the embodiment shown in FIG. 3 except that, prior to billing the fee to the calling party's account, a determination is made as to whether the calling party has authorized these types of fees to be billed to its account, as indicated at step 45. This feature of the present invention is intended to prevent calling parties from being billed without their knowledge or consent. A determination is made at step 43 as to whether the calling party is on the list of authorized calling parties. If so, the calling party is connected with the called party without the fee being charged, as indicated at block 44. If the calling party is not on the list of authorized calling parties, a determination is made as to whether the calling party has authorized billings for these types of fees to be charged to its account, as indicated at block 45. If not, the calling party is informed that it has not authorized these types of billings, as indicated at block 47.

If the calling party has authorized such billings, the fee is charged to the calling party's billing account and the calling party is connected with the called party, as indicated at block 46. The calling party's billing account is then updated, as indicated at block 48. The percentage of the fee to be added to the called party's account is then calculated, as indicated at block 49, and the called party's billing account is updated, as indicated at block 51. Whatever percentage of the fee that is not added to the called party's account may be retained by the telephone company. However, as indicated above, the manner in which the fee is allocated is not critical to the present invention.

It should also be noted that the methods of the present invention described above can also be used with facsimile machines since these also make use of the telephone network and since the telephone number of the calling facsimile machine is contained in the common-channel signaling information. In this case, the steps performed in FIGS. 3 and 4 will also be performed for facsimile communications using the telephone number of the facsimile initiating the communication.

It should be noted that the present invention has been described with respect to particular embodiments, but that the present invention is not limited to these embodiments. It will also be understood by those skilled in the art that the manner in which an unauthorized calling party is billed with a fee and the manner in which the billing account of the calling or receiving party is updated is not limited to any particular method. Also, the location at which the billing of the fee and the updating of any accounts is performed is not limited to any particular location. This preferably is performed at the central office connected to the customer premises, but may also be performed at some location in the telephone network which is in communication with the customer premises. It will be understood by those skilled in the art that other modifications and variations to the embodiments of the present invention discussed above can be made which are in the scope and spirit of the present invention.

What is claimed is:

1. An apparatus for determining a fee to be charged to a calling party initiating a telephone call directed to a telephone of a called party, the telephone of the called party having a wired connection to a central office (CO) of a Public Switched Telephone Network (PSTN), the apparatus comprising:

a computer in communication with the PSTN, the computer being programmed to detect an indication of an origin of a telephone call initiated by a calling party and to compare the indication to an authorization list to determine whether or not the calling party is an authorized calling party, the authorization list corresponding to a list of calling parties from whom the called party desires to receive telephone calls, wherein if the computer determines that the calling party is not an authorized calling party, the computer calculates a fee to be charged to the calling party, the calculated fee being intended to dissuade undesired calling parties from placing telephone calls to the called party and to enable fees to be generated as consideration for efforts made by the called party to receive undesired telephone calls from undesired calling parties, the telephone of the called party being a non-wireless telephone.

2. The apparatus of claim 1, wherein the central office services a telephone associated with the called party.

3. The apparatus of claim 2, wherein said indication corresponds to a telephone number associated with a telephone from which the telephone call initiated by the calling party is made.

4. The apparatus of claim 2, wherein said indication corresponds to the name of the calling party.

5. The apparatus of claim 2, wherein the telephone network utilizes common-channel signaling, and wherein a signaling processor of the telephone network transmits common-channel signaling information to said central office, the common-channel signaling information including the telephone number associated with the telephone from which the calling party initiated the telephone call and the telephone number of the called party to which the telephone call is directed, the computer using the telephone number of the called party to access the authorization list associated with the called party, the authorization list associated with the called party containing telephone numbers of authorized calling parties, the computer comparing the telephone number of the calling party with each of the telephone numbers of the authorized calling parties contained on the authorization list to determine whether the calling party is an authorized calling party.

6. An apparatus for determining a fee to be charged to a calling party initiating a telephone call to a called party, the telephone of the called party having a wired connection to a central office (CO) of a Public Switched Telephone Network (PSTN), the apparatus comprising:

means for determining whether the calling party is an authorized calling party, said means being in communication with the PSTN, said means detecting an indication of an origin of a telephone call initiated by the calling party and comparing the indication to an authorization list to determine whether or not the calling party is an authorized calling party, the authorization list corresponding to a list of calling parties from whom the called party will receive telephone calls, wherein if said means determines that the calling party is not an authorized calling party, the said means calculates a fee to be charged to the calling party, the calculated fee being intended to dissuade undesired calling parties from placing telephone calls to the called party and to enable fees to be generated as consideration for efforts made by the called party to receive undesired telephone calls from undesired calling parties, the telephone of the called party being a non-wireless telephone.

7. The apparatus of claim 6, wherein the central office services a telephone associated with the called party.

8. The apparatus of claim 7, wherein said indication corresponds to a telephone number associated with a telephone from which the telephone call initiated by the calling party is made.

9. The apparatus of claim 7, wherein said indication corresponds to the name of the calling party.

10. The apparatus of claim 6, wherein the PSTN utilizes common-channel signaling, and wherein a signaling processor of the PSTN transmits common-channel signaling information to said central office, the common-channel signaling information including the telephone number associated with the telephone from which the calling party initiated the telephone call and the telephone number of the called party, said means using the telephone number of the called party to access the authorization list associated with the called party, the authorization list associated with the called party containing telephone numbers of authorized calling parties, said means comparing the telephone number of the calling party with each of the telephone numbers of the authorized calling parties contained on the authorization list to determine whether the calling party is an authorized calling party.

11. A method of determining whether an incoming telephone call initiated by a calling party and directed to a telephone of a called party is an authorized telephone call, the telephone of the called party having a wired connection to a central office (CO) of a Public Switched Telephone Network (PSTN), the method comprising the steps of:

decoding signaling information associated with the telephone call initiated by the calling party, wherein said decoding uses a computer in communication with a PSTN, the signaling information including an indication of the origin of the telephone call initiated by the calling party and an indication of the called party to whom the telephone call is directed;

comparing the indication of the calling party to information contained on a list of authorized calling parties associated with the called party to determine whether or not the calling party is an authorized calling party;

if a determination is made that the calling party is not an authorized calling party, calculating a fee to be billed to the unauthorized calling party and connecting the calling party with the called party, the calculated fee being intended to dissuade undesired calling parties from placing telephone calls to the called party and to enable fees to be generated as consideration for efforts made by the called party to receive undesired telephone calls from undesired calling parties, the telephone of the called party being a non-wireless telephone; and if the calling party is an authorized calling party, connecting the authorized calling party with the called party without calculating a fee to be charged to the authorized party, the called party's telephone being a non-wireless telephone.

12. The method of claim 11, wherein the telephone call initiated by the calling party is initiated by a facsimile machine.

13. The method of claim 12, wherein the telephone number to which the call initiated by the calling party is directed corresponds to a facsimile machine.

14. The method of claim 11, wherein the telephone number to which the telephone call initiated by the calling party is directed corresponds to a pager.

15. A computer-readable medium having a computer program stored thereon, the computer program determining whether a fee is to be billed to an unauthorized calling party placing a call to a telephone of a called party, the telephone of the called party having a wired connection to Public Switched Telephone Network (PSTN), said fee being intended to dissuade undesired calling parties from placing telephone calls to the called party and to enable fees to be generated as consideration for efforts made by the called party to receive undesired telephone calls from undesired calling parties, the computer program comprising:

a first code segment which determines whether a calling party initiating a telephone call to a called party is contained on a list of authorized calling parties associated with the called party, wherein said determination is made using a computer in communication with a telephone network and located at a central office of a public switched telephone network; and a second code segment which calculates the fee to be billed to the calling party if the first code segment determines that the calling party initiating the telephone call is not an authorized calling party, the telephone of the called party being a non-wireless telephone.

16. The computer-readable medium of claim 15, further comprising a third code segment, the third code segment determining whether the calling party has authorized the unauthorized caller fee to be charged to the calling party, wherein the third code segment causes the fee amount to be charged to the unauthorized caller if the third code segment determines that the calling party has authorized the unauthorize caller fee to be charged to the calling party.

17. The computer-readable medium of claim 16, further comprising a fourth code segment, the fourth code segment generating a message to be communicated to the calling party when the third code segment determines that the calling party has not authorized the unauthorized caller fee to be charged to the calling party, wherein the message generated and communicated to the calling party informs the calling party that the calling party has not authorized the fee to be charged to the calling party.

18. The computer-readable medium of claim 17, further comprising a fifth code segment, the fifth code segment calculating a percentage of the fee charged to the calling party and subtracting the percentage of the charged fee from a telephone billing account associated with the called party.

19. An apparatus for determining whether a calling party initiating a telephone call directed to a telephone of a called party will be connected to the called party, the telephone of the called party having a wired connection to a Public Switched Telephone Network, the apparatus comprising:

a computer in communication with a telephone network, the computer being programmed to detect an indication of an origin of a telephone call initiated by a calling party and to compare the indication to an authorization list to determine whether or not the calling party is an authorized calling party, the authorization list corresponding to a list of calling parties from whom the called party is willing to receive telephone calls, wherein if the computer determines that the calling party is not an authorized calling party, the computer prevents the calling party from being connected to the called party thereby screening the telephone call, wherein if the computer determines that the calling party is an authorized calling party, the computer connects the calling party with the called party to thereby enable the calling party to communicate with the called party, wherein the computer is located at a central office of a public switched telephone network, the central office servicing a telephone associated with the called party, the telephone of the called party being a non-wireless telephone.

* * * * *